2,761,763

PRODUCTION OF GASES CONTAINING SULFUR DIOXIDE

Adolf Johannsen, Ludwigshafen (Rhine), Willi Danz, Ludwigshafen (Rhine)-Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen (Rhine), Germany No Drawing. Application October 26, 1950, Serial No. 192,374

Claims priority, application Germany November 9, 1949

6 Claims. (Cl. 23—177)

This invention relates to improvements in the production of gases containing sulfur dioxide by roasting sulfur-containing ores.

It has already been proposed to roast pyrites, without the aid of mechanical devices serving to move the material, by using the stream of oxygen-containing gases necessary for the roasting to keep the particles of the pyrites in movement during the roasting. Thus, the so-called dust roasting process, in which the pyrite in the form of dust is processed in burners similar to coal dust burners, necessitates a particle size of the pyrites of mainly less than 0.1 millimetre if a satisfactory roasting is to be obtained during the short time during which the pyrites particles suspended in the gas stream are led through the reaction space. A more recently published attempt to roast flotation concentrates of arsenical pyrites containing gold, in a so-called fluidized bed in order to expel arsenic and sulfur and to prepare a roasted material which is suitable for subsequent extraction with cyanide for the recovery of gold, had to be carried out with a fine material consisting to the extent of 75 to 90 percent of particles having a grain size of less than 0.075 down to 0.001 millimetre.

Our present invention, on the contrary, is based on the discovery that such a far-reaching comminution of the material to be roasted is not necessary but that the industrial recovery of gases containing sulfur dioxide according to the principle already employed for other reactions, in particular for the gasification of brown coal and lignite coke with a low piled weight, of carrying out the reaction within a layer in which the comminuted solid material is in up and down whirling motion, i. e. in a so-called fluidized bed, can be effected without trouble and with an excellent degree of roasting also when the grain size of the sulfide-containing ore to be roasted is considerably greater than, and indeed is a multiple of, that employed in the said known attempt. Thus we have found that from iron pyrites with an arsenic content of mostly less than 2%, such as are generally employed in the sulfuric acid and sulfite cellulose industries for the preparation of roasting gases in mechanical roasting ovens, rotary tubular furnaces or pieced-pyrites furnaces with a stationary layer, it is possible to produce roasting gases with the usual or with a considerably increased content of sulfur dioxide by continuously or periodically introducing such pyrites in a preponderating grain size of 0.1 to about 10 millimetres into a layer of the corresponding roasted material which is heated to the roasting temperature and which is kept in a whirling motion similar to that of a boiling liquid by means of a current of oxygen-containing gases such as air or air enriched with oxygen entering the layer from below and by means of the roasting gases formed under a strongly exothermic reaction.

The pressure under which the air passes through the reacting layer, is advantageously kept lower than the gas resistance resulting from the piled weight of the material contained in the layer and the height of the layer in the quiescent state. Thus with a layer kept at the roasting temperature by continuous supply of iron pyrite and which is charged with a pyrite having a piled weight of 2.2 kilograms per litre and which in operation consists mainly of roasted material having a piled weight of 1.42 kilograms per litre, the pressure difference in the flowing gases, with a layer height of 50 centimetres in the quiescent state, amounts to only about 35 centimetres water column (including the gas resistance of the base plate formed like a grate), whereas the hydrostatic gas resistance for the said roasted material amounts to 71 centimetres water column and for the pyrite to 110 centimetres water column.

For example according to the present process, using air and at a pressure difference of only about 35 to 80 centimetres water column in a layer of about 50 to at the most 100 centimetres in height and employing a Spanish iron pyrite having a sulfur content of 48 percent and consisting to the extent of about 44 percent of grains of from 1 to 2 millimetres, to about 50 percent of grains of from 0.5 to 1 millimetre and only to about 6 percent of grains up to 0.5 millimetre, there is obtained a roasted product (of which about 30 percent is obtained as flue dust) having a sulfur content of less than 0.5 percent and roasting gases poor in oxygen and containing 13 to 14 percent of sulfur dioxide. Suitable measures are taken to avoid the occurrence of temperatures which would lead to softening of the roasted material and consequent disturbances in the whirling layer.

The average residence time of the pyrite particles in the roasting zone amounts to scarcely 2 hours, whereas in a usual roasting furnace with mechanically moved stirrers this time is more than 8 hours and this furnace, when using air, generally yields roasting gases having a considerably lower sulfur dioxide content.

The superior efficiency of the new process may be seen from the following comparison: The material consisting of roasted pyrite and subordinate amounts of freshly supplied pyrite is placed in a cylindrical chamber of refractory bricks having an internal diameter of 1.6 metres the bottom of which is provided with perforations for the entry of the roasting air. With a layer height of 0.5 metre the content of material, corresponding to the utilisable cross-section of 2 square metres, amounts to 1 cubic metre which corresponds to an amount of about 1.5 metric tons. In this extremely simple arrangement requiring little space there is obtained, with an average residence time of about 2 hours, an hourly throughput of 1.05 metric tons of pyrite (corresponding to about 0.48 cubic metre) and a daily throughput of 25.2 metric tons, i. e. a higher output than in a mechanical stage furnace with a daily output of 20 metric tons which has an external diameter of 6.5 metres and is subdivided into 7 stages each having about 30 square metres of utilizable roasting surface and in which the residence time amounts to more than 8 hours. If, corresponding to these dimensions, the above described arrangement were to be given an internal diameter of 6.2 metres, corresponding to a utilizable cross-section of 30 square metres, there would be an hourly output of about 16 metric tons of pyrite or a daily throughput of about 380 metric tons of pyrite.

The present process also has considerable advantages over the known dust roasting process because there is no need for a very fine grinding and a preliminary drying, which latter is an additional requirement for the working up of floated pyrites in dust burners. Furthermore whereas the dust roasting process often yields a too strongly sintered material which, in so far as it contains, besides iron, other constituents worth working up, can only be processed with difficulty, the roasted material obtained by the present process is free from such drawbacks.

In the case of pyrites having a stable structure and only a slight tendency to abrasion, it is preferable, in order to avoid disturbances in the whirling motion, to withdraw the roasted material not only from the upper parts of the layer but also, even though to a subordinate extent, from the middle and, if necessary, from the lower parts of the layer.

Within the whirling layer, during the roasting, there takes place a certain distribution of the particles which are to be roasted and the particles which have been roasted according to their grain size and composition. This distribution is determined by the roasting speed which increases with the roasting temperature, by the disintegration of the grains which is dependent on the intensity of the whirling motion and the structural stability of the material, by the amount of flue dust entrained by the roasting gases and by the decrease in the specific gravity of the material during the roasting process. For example in a layer having a height of 55 centimetres in the quiescent state which is kept at temperatures of about 800° C. and which is charged with comminuted iron sulfide-zinc sulfide ore containing about 75 percent of iron disulfide, 10.5 percent of zinc sulfide and 12 percent of gangue (grain size mainly between 0.1 and 4 millimetres), the sulfur content in the lowermost layer is 11.5 percent and it decreases substantially constantly to 1.7 percent in the uppermost layer while the average sulfur content of the whole layer is 4.5 percent. This distribution is independent of the height at which the pyrite is fed to the whirling layer, and is to be attributed to the higher specific gravity of the pyrite as compared with the roasted material. With this distribution of the material according to the value of its sulfur content it seems to be preferable to withdraw the roasted ore from the surface of the layer which in the whirling state is about 70 to 75 centimetres in height. By these statements there is also given an upper limit for the height of the layer.

An examination of the distribution of the grain size gives the following picture: The average grain size decreases substantially constantly from 2.2 millimetres in the lowermost layer to 1.7 millimetres in the uppermost layer. The distribution of the grain sizes in the whole layer may be seen from the table below. The comparison is made with the rain distribution in the uppermost layer (height 60 to 75 centimetres), a middle layer (height 20 to 35 centimetres) and the lowermost layer (height 0 to 7 centimetres). The height values give the distance from the underside of the layer which is in the whirling state.

| Grain size | Distribution of the grain sizes | | | |
| --- | --- | --- | --- | --- |
| | in the whole layer (average value) | in three partial layers | | |
| | | 60–75 cm. | 20–35 cm. | 0–7 cm. |
| | Percent | Percent | Percent | Percent |
| more than 4 mm | 2.1 | 0.6 | 2.4 | 9.0 |
| 2 to 4 mm | 33.6 | 22.7 | 39.0 | 37.0 |
| 1 to 2 mm | 56.6 | 62.6 | 54.5 | 50.0 |
| 0 to 1 mm | 7.9 | 14.0 | 3.8 | 4.0 |
| Sulfur content | 4.5 | 1.7 | 4.3 | 11.5 |

By sole withdrawal of the roasted mateiral from the upper parts of the layer there is therefore withdrawn from the whirling layer a smaller fraction with a grain size of 2 to 4 millimetres and of more than 4 millimetres than corresponds to the average grain distribution. Thus there is an enrichment of these coarser grain sizes in the lower portions of the layer, and this leads to a worsening of the whirling motion, which is not the case when roasted material is additionally withdrawn in subordinate amounts from the whirling layer at one or more places in the middle portion of the layer or if necessary from even lower portions of the layer. As may be seen from the table, the proportion of coarse-grained constituents is higher at a layer height of 20 to 35 centimetres than in the whole layer, so that an additional continuous or periodic withdrawal of roasted material at this place renders possible a maintenance of a grain distribution most favorable for the whirling motion, in so far as this is not established of itself by abrasion and grain disintegration under the influence of the intense whirling motion and by entrainment of flue dust.

The above statements relate to a whirling layer which is not operated under the most favorable reaction conditions in order to bring out more strongly the differences in the degree of roasting in the individual layers. At higher roasting temperatures, for example at 1000° C., the roasted material obtained by withdrawal from the upper and middle parts of the layer has a sulfur content of less than 1 percent and the average sulfur content of the whole layer is also correspondingly lower.

When employing pyrites having a wider grain size interval, as for example 0.1 to 8 millimetres, and a higher structural stability, it is preferable to withdraw the material from the whirling layer at more than two places at different heights. It may be advisable to subject the material withdrawn in subordinate amounts from the lower parts to another roasting, which may also be effected in a whirling layer, the conditions, especially as regards the speed of the flow of the gases, being adapted to the nature of this coarse-grained material.

The following examples will further illustrate the invention but the invention is not restricted to these examples.

Example 1

From commercial Rio Tinto fine pyrite having a sulfur content of 48 percent, the fraction having a grain size of 0 to 6 millimetres is sieved out. The fraction having a grain size of more than 6 millimetres (about 22% of the whole) is broken to a grain size of about 6 mm. by rolling and then combined with the main fraction of about 78 percent which has previously been sieved out. The pyrite prepared in this manner contains 0.8 percent of particles having a grain size of more than 6 millimetres, 10.7 percent of 4 to 6 millimetres, 34.0 percent of 2 to 4 millimetres, 18.6 percent of 1 to 2 millimetres, 15.4 percent of 0.5 to 1 millimetre, 17.2 percent of 0.1 to 0.5 millimetre and 3.2 percent of less than 0.1 millimetre. It is roasted with air in a whirling layer having a height in the quiescent state of 45 centimetres with a throughput of 350 kilograms of pyrites per square metre of roasting surface per hour. The temperature in the whirling layer is kept at 840° C. The air enters the layer under a pressure corresponding to a water column of 45 centimetres. The roasting gases obtained contain 10.8 percent of sulfur dioxide. The average sulfur content of the roasted material amounts to 1.9 percent. In the whirling layer there occurs a reduction in grain size by decrepitation and abrasion so that in the roasted material, including the flue dust, the grain size of 4 to 6 millimetres is only present in an amount of 5.4 percent.

Example 2

From an iron sulfide-zinc sulfide ore containing about 75 percent of iron disulfide, 10.5 percent of zinc sulfide and 12 percent of gangue and having the following grain sizes: 6 to 8 millimetres 3.7 percent, 4 to 6 millimetres 38.5 percent, 2 to 4 millimetres 35.5 percent, 1 to 2 millimetres 10.5 percent and 0 to 1 millimetre 11.6 percent, the fraction having a grain size of 0–4 millimetres is sieved out. The fraction having a grain size of more than 4 millimetres (amounting to 42.2 percent) is broken to a grain size of 0 to 4 millimetres by rolling and united with the sieved-out fraction of 57.6 percent. The ore thus prepared is roasted in a whirling layer, having a height of 50 centimetres in the quiescent state, with a throughput of 480 kilograms per square metre of roasting surface per hour. The temperature in the whirling layer is kept at about 1000° C. Roasting gases having a content of about 15 percent of sulfur dioxide and roasted ore having a sulfur content of 0.94 percent are obtained. In this example, the sulfur content of the ore can be calculated and is approximately 43%.

What we claim is:

1. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.1 to 10 millimeters to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sulfidic sulfur in said fluidized bed does not exceed about 4.5% by weight of the solids in the bed, maintaining the temperature in said fluidized bed below the softening temperature of said roasted ore, and withdrawing substantially completely roasted ore from said fluidized bed.

2. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.1 to 4 millimeters to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sufidic sulfur in said fluidized bed does not exceed about 4.5% by weight of the solids in the bed, maintaining the temperature in said fluidized bed below the softening temperature of said roasted ore, and withdrawing substantially completely roasted ore from said fluidized bed.

3. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.5 to 2 millimeters to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sulfidic sulfur in said fluidized bed does not exceed about 4.5% by weight of the solids in the bed, maintaining the temperature in said fluidized bed below the softening temperature of said roasted ore, and withdrawing substantially completely roasted ore from said fluidized bed.

4. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.1 to 10 millimeters with a wide grain size interval and a stable structure to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sulfidic sulfur in said fluidized bed does not exceed about 4.5% by weight of the solids in the bed, maintaining the temperature in said fluidized bed below the softening temperature of said roasted ore, and withdrawing substantially completely roasted ore from said fluidized bed mainly at points in the upper parts of said bed and to a subordinate extent at points in the other parts of said bed.

5. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.1 to 10 millimeters to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sulfidic sulfur in said fluidized bed does not exceed about 4.5% by weight of the solids in the bed, maintaining the temperature in said fluidized bed below the softening temperature of said roasted ore, and withdrawing substantially completely roasted ore from said fluidized bed at a rate such that the average dwelling time of the particles in the bed is within about two hours.

6. A one-stage process for the production of gases containing sulfur dioxide from a large-particled sulfidic ore consisting predominantly of metallic sulfide which comprises maintaining previously roasted ore in a single fluidized bed thereof having substantially the same degree of agitation throughout, maintaining the height of said bed below a maximum of about 100 centimeters when measured in the quiescent state, supplying fresh ore having a preponderating grain size of 0.1 to 10 millimeters to said fluidized bed, roasting said ore in said fluidized bed by passing an oxygen-containing gas through the bed from below, said bed being maintained in the fluidized state by said passage of oxygen-containing gas and by the roaster gases formed by the burning of the sulfur in said sulfide, maintaining the roasting temperature sufficiently high and a controlled feeding rate such that the average concentration of sulfidic sulfur in said fluidized bed does not exceed about 4.5% by weight of the solids in the bed, maintaining the temperature in said fluidized bed below the softening temperature of said roasted ore, and withdrawing substantially completely roasted ore having an average sulfidic sulfur content less than about 1.9% by weight from said fluidized bed.

(References on following page)

References Cited in the file of this patent

UNITED STATES PATENTS

| | | |
|---|---|---|
| 1,322,652 | Testrup | Nov. 25, 1919 |
| 1,776,876 | Winkler | Sept. 30, 1930 |
| 1,812,397 | Freeman | June 30, 1931 |
| 1,912,621 | Clark | June 6, 1933 |
| 1,941,592 | Bacon et al. | Jan. 2, 1934 |
| 2,002,496 | Freeman | May 28, 1935 |
| 2,028,416 | Silsby | Jan. 21, 1936 |
| 2,030,627 | Freeman | Feb. 11, 1936 |
| 2,047,995 | Cordy et al. | July 21, 1936 |
| 2,070,235 | Mullen | Feb. 9, 1937 |
| 2,070,531 | Gallagher et al. | Feb. 9, 1937 |
| 2,074,061 | Mullen | Mar. 16, 1937 |
| 2,075,823 | Mullen et al. | Apr. 6, 1937 |
| 2,522,576 | Ingraham | Sept. 19, 1950 |
| 2,586,818 | Harms | Feb. 26, 1952 |
| 2,591,595 | Ogorzaly | Apr. 1, 1952 |
| 2,621,118 | Cyr | Dec. 9, 1952 |
| 2,683,077 | Lewis | July 6, 1954 |